Jan. 26, 1960 P. C. AUST 2,922,611
METHOD FOR FILLING POWDERED OR GRANULAR
MATERIALS INTO CONTAINERS
Filed June 7, 1957 6 Sheets-Sheet 1

FIG_1

INVENTOR
PAUL C. AUST
BY
ATTORNEYS

United States Patent Office 2,922,611
Patented Jan. 26, 1960

2,922,611
METHOD FOR FILLING POWDERED OR GRANULAR MATERIALS INTO CONTAINERS

Paul C. Aust, Mission San Jose, Calif., assignor to Food Machinery and Chemical Corporation, San Jose, Calif., a corporation of Delaware Application June 7, 1957, Serial No. 664,201

12 Claims. (Cl. 249—3)

The present invention relates to methods of filling powdered or granular materials into suitable containers, such as bags of fabric or paper.

It is an object of the present invention to provide a simple and effective method of packing powdered or granular materials into containers.

Another object is to provide a method of tightly filling bags with powdered or granular materials without employing mechanical compression means of any kind whereby the density of the powdered material in the shipping container may be increased over that of other packing methods.

Another object is to provide a method for tightly filling bags with powdered material in which there is no plugging of the filling nozzle after a bag is filled, the apparatus being immediately ready for filling the next bag.

Another object is to provide a fast and efficient method of packing troublesome powdered or granular materials into containers.

Still another object is to provide a method, of the type referred to, that is effective to pack more powdered or granular material into a space of given size than previously possible, even when positive compression means were employed whereby the size of bags and other shipping containers required to hold a given weight of material may be decreased.

An additional object is to provide a method of packing powdered or granular materials into containers that permits maintaining the amount of material filled into the containers within closer limits than was previously possible, by means of an automatic dribble control which permits rapid filling of the bags or shipping containers at the beginning of the filling operation and automatically retards the flow of material into the bags as the bags approach the desired weight whereby more accurate weights may be maintained.

A further object is to provide a method of packing powdered or granular materials into paper bags without running the risk of exploding the bags, such as occurred when positive means were employed to force the materials into the bags.

This application is a continuation-in-part of my copending applications Serial No. 353,931 filed May 11, 1953, now Patent No. 2,795,389 and Serial No. 456,676 filed September 17, 1954 now Patent No. 2,905,362.

In accordance with the invention, the powdered or granular material is fluidized by means of a gaseous fluidizing medium, such as air, before and as it is filled into the container and escape of the gaseous fluidizing medium from the container is controlled so as to build up a back pressure in the container during filling to prevent too rapid escape of the fluidizing medium from between the powdered particles. It has been found that powdered or granular materials while in a fluidized condition flow rapidly from the fluidizing chamber into the container without, or with a minimum of, lump formation and without danger of clogging the filling spout. Moreover, powdered or granular materials filled into bags while in a fluidized condition and with controlled escape of the fluidizing medium from the container pack at much higher bulk densities than can be accomplished by ordinary filling methods, including those employing positive means of compression such as auger impellers. Hence, a firmer and more easily handled package results and smaller bags can be used to package a given weight of material. Furthermore, when filling powders or granular materials in fluidized form into containers, as taught by the present invention, much higher weighing accuracies may be obtained than in arrangements employing movable feed means such as augers, because as the back pressure increases in the container when it nears complete filling, the rate of flow of the powdered material into the container is decreased and the flow of fluidized powder may be interrupted as easily and as instantaneously as the flow of a liquid whereby very accurate weights may be maintained. As an added advantage, it has been found that in the practical performance of the process of the invention, there is far less dust formation in the space surrounding the filling apparatus of the invention than previously encountered around filling machines due to the substantially complete closure of any space between the bag or container and the filling nozzle, and whenever paper bags are filled with powdered or granular materials, in accordance with the invention there is no danger that the bags may explode, such as occurred all too frequently when positive means for delivering the powdered materials into the bags were employed. The advantages of the present invention are particularly striking when the method of the invention is applied to powders that are sluggish and do not ordinarily flow freely. The same is true for very heavy powder such as would clog augers, and for sticky powders that tend to bridge over augers.

As an additional advantage the method of filling powdered or granular materials into containers in accordance with the present invention requires no power driven movable components to advance the material and as a result thereof, the apparatus of the invention is simpler and less costly in construction than powder filling equipment at present in use. Also, there is practically no wear and no maintenance expense, whereas known filling apparatus are subject to frequent breakdown due to the fact that the dust developed during the filling operation penetrates into the bearings of their movable components where it causes excessive wear and may eventually bring the whole operation to a halt.

The above mentioned objects of the invention and other objects and advantages thereof will be apparent from the following description and the accompanying drawings which illustrate a preferred embodiment of the invention and wherein:

Figure 1:
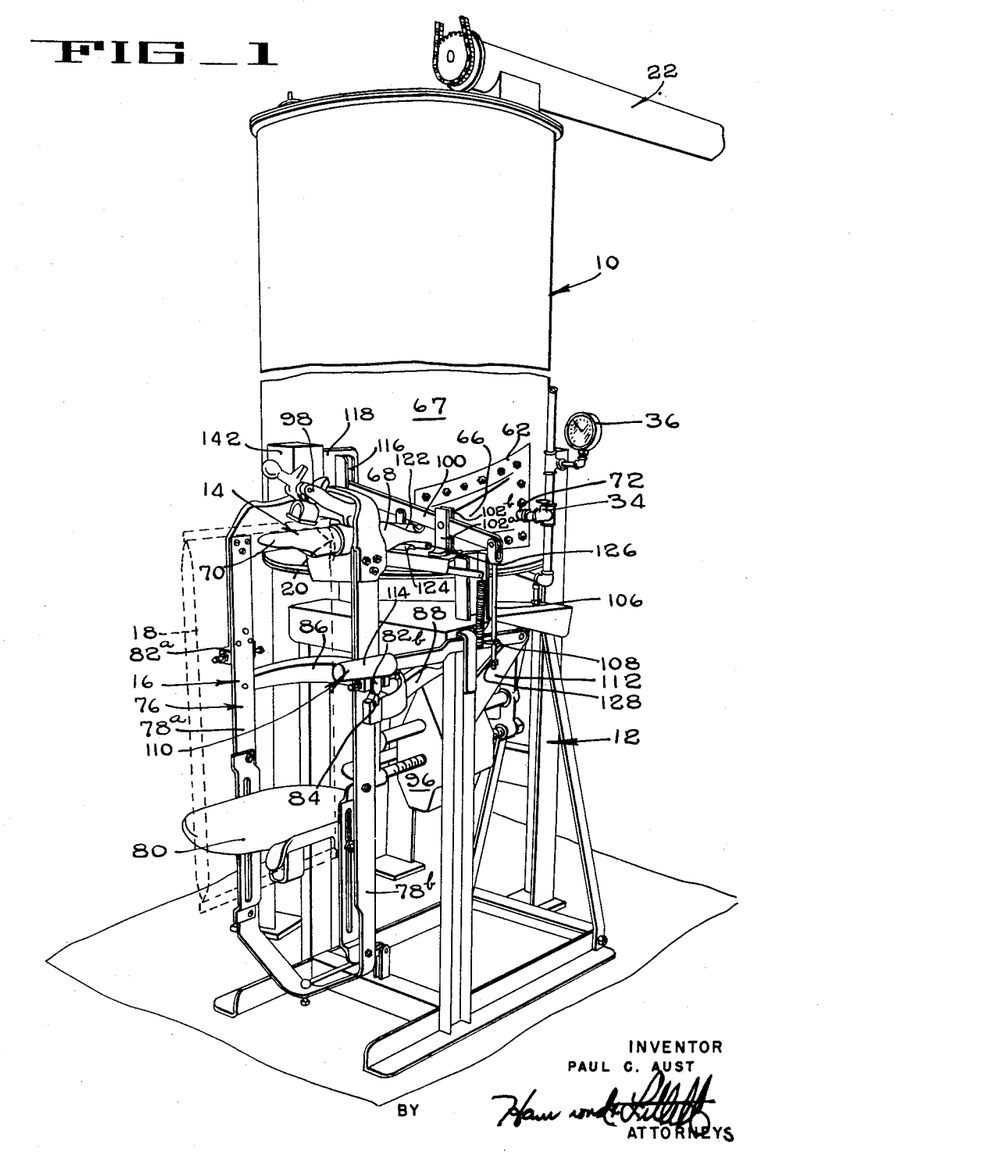
Fig. 1 is a perspective of a bag filling apparatus embodying the invention.

Having reference to Fig. 1, the filling apparatus embodying the present invention comprises a tall cylindrical tank 10 that is mounted upon a suitable pedestal 12 and which is provided at its lower end with a discharge spout 14. In addition the apparatus comprises mechanism 16 that holds a bag 18 which is closed at both ends and is provided with a valved filling opening 20 which fits closely over the discharge spout 14, thereby forming a confined space at the upper end of the bag 18 and which apparatus is also adapted to close the spout and to terminate the flow of fluidized powder as soon as the weight of the material delivered into the bag reaches a predetermined upper limit.

Figure 2:
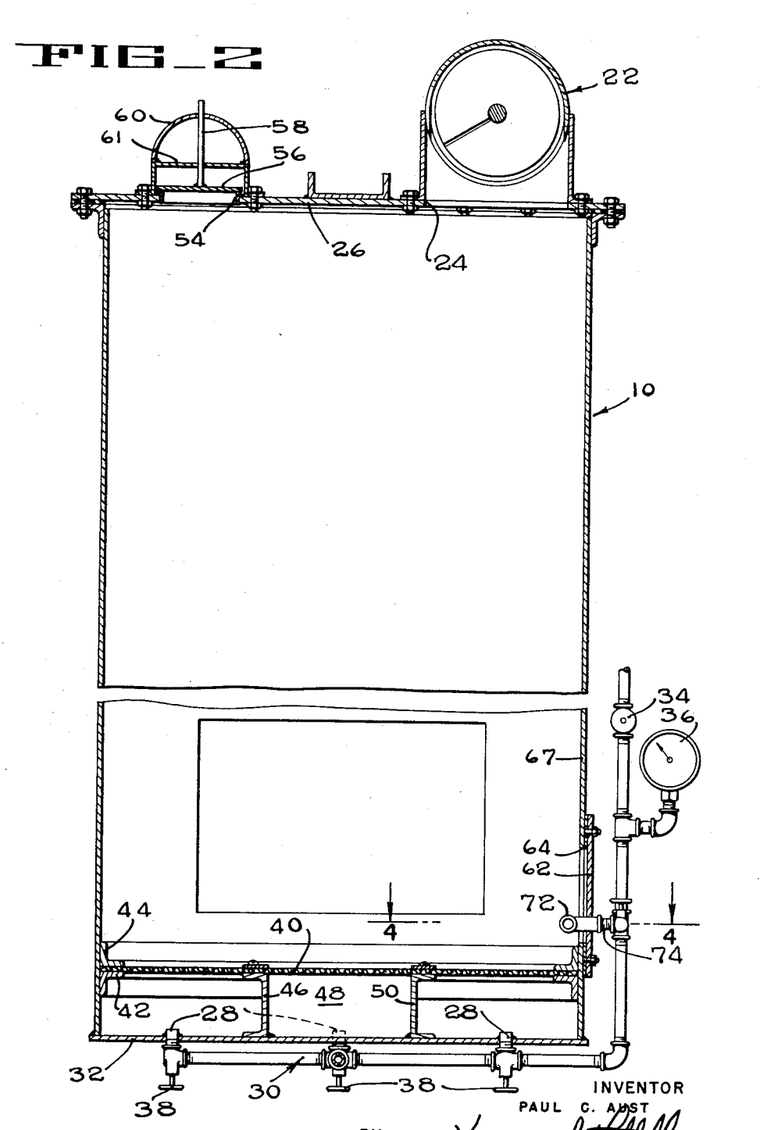
Fig. 2 is a vertical section through the fluidizing chamber of the apparatus illustrated in Fig. 1.

A worm conveyor 22 may be arranged to deliver the powdered material from a suitable hopper (not shown) into the cylindrical tank through an aperture 24 provided in the ceiling 26 of said tank, while compressed air from a suitable source (not shown) is introduced into the tank 10 at the bottom end thereof through a plurality of injection nozzles 28 that protrude from a manifold 30 below the floor 32 of the tank through said floor into the interior of the tank, as best shown in Fig. 2. Said manifold 30 may be provided with a master valve 34 and a pressure meter 36, and each of the nozzles 28 may have their individual control valves 38. To distribute the air jets introduced through the nozzles 28 uniformly over the interior of the tank, a circular pad 40 of canvas or similar porous fabric may be arranged a limited distance above the nozzles 28 as likewise shown in Fig. 2 wherein such a pad is held between collars 42 and 44 that are suitably secured to the inner wall of the cylindrical tank, and wherein said pad is supported on a number of channel bars 46, 48 and 50. To permit the air delivered into the tank 10 to escape, a suitable aperture 54 may be formed in its ceiling 26 and may be loosely covered by a lid 56 which is constrained to vertical movement by means of an outwardly directed vertical stem 58 that is slidably received within an arch 60 bolted to the ceiling 26 and a cross bar 61 disposed within and suitably supported from said arch.

By appropriately controlling the velocity of the air currents injected into the tank through the nozzles 28 depending upon the fineness and the specific weight of the powder to be packed, the powder within said tank, while permitted to drop from the ceiling to the bottom of said tank, may be held in a suspended condition closely resembling a liquid. The particles of powder in such suspension appear to be more densely packed at the bottom of the tank or column than at the top, as the density of the material packed into shipping containers under controlled escape of air from the shipping container will vary with the height of the column of powder suspension.

The hereinbefore mentioned discharge spout 14 near the bottom of the tank 10 may be formed by an arcuate plate 62 that is bolted in an airtight manner over a suitable aperture 64 in the side wall of the tank and which forms a short tubular projection 66 extending in a direction tangentially of the cylindrical side wall 67 of the tank. Drawn over and securely fastened to said projection 66 is a short tube 68 of resilient material, such as rubber, within the free end of which is received a suitable filling nozzle 70. An additional air nozzle 72 (Figs. 2 and 4) may be arranged to direct an air jet into the tubular projection 66 and push the powder in fluidized condition from the interior of the tank through the spout 14 and into the bag 18 held over the filling nozzle thereof (Fig. 1). Said nozzle 72 may be supplied with air from the common manifold 30 through a short pipe 74 that extends through the arcuate plate 62. An alternative form of discharge nozzle from the fluidizing tank to the shipping container in which the auxiliary nozzle 72 is not used is illustrated in my copending application Serial No. 456,676 filed September 17, 1954.

The mechanism 16 for supporting a bag in proper filling position and for terminating the flow of powdered material into said bag whenever the proper filling weight has been reached, comprises a frame 76 having transversely spaced vertical side bars 78a and 78b from the lower portions of which is adjustably supported a suitable platform 80. Said frame rests with shoulders 82a and 82b provided on the outer faces of said bars upon the upper ridges of triangular bearing blocks which are secured to the ends of an open stirrup 86 formed at one end of a scale bar 88. Said scale bar turns on a transverse spindle 90 that is mounted in uprights 92a and 92b of a special pedestal 94, and from the opposite end of said scale bar is supported a counterweight 96 in such a manner that its position longitudinally of said bar may be adjusted so as to vary its effective pull on said bar.

During practical performance of the machine, the operator places a bag upon the platform 80, pushes its lateral filling snout 20 over the filling nozzle 70 and lowers a suitable clamp 98 upon the snout so as to hold the bag dependably over and on to said nozzle. As illustrated in said copending application Serial No. 456,676 the filling nozzle 70 is of frustro conical shape so that as the filling snout 20 of the bag 18 is pushed over the frustro conical filling nozzle the opening between the bag and the filling snout is substantially closed so as to restrict the outflow of air from the bag as will be later described. The pressure of the clamp 90 also restricts outflow of air from the bag during filling.

The mechanism for terminating the flow of fluidized powder from the tank 10 at the appropriate moment comprises a bar 100 that extends transversely across the hereinbefore described resilient center portion 68 of the discharge spout 14 and which is pivotally supported between a pair of legs 102a and 102b that rise from and are bolted to a shelf 104 which is rigidly supported from the pedestal 94 and which extends below the resilient center portion of the spout within the vertical plane determined by the aforementioned bar 100. The end of said bar 100 remote from the spout 14 is pivotally connected to the upper end of a vertical link 106, and the lower end of said link protrudes through an apertured lug 108 that projects laterally from an actuating lever 110. One end of said lever is pivotally supported from a bracket 112 that is rigidly secured to the upright 92b of pedestal 94, while the other end of said actuating lever is formed into a handle 114 that is positioned adjacent the right side bar 78b of the supporting frame 76 within convenient reach of an operator attending to the machine.

The free end of bar 100 moves in a vertical guide slot 116 (Figs. 5 and 6) provided in a plate 118 that is rigidly supported from the shelf 104 and a strong spring 120 tensioned between the guided end of bar 100 and a suitable point of pedestal 94 below the shelf 104 yieldably urges the bar into the substantially horizontal position shown in broken lines in Fig. 5, which is determined by engagement of said bar 100 with the lower end of the guide slot 116. In said position, the bar 100 presses, through the urgency of the spring 120, a shoe 122 pivotally supported from its lower edge against the yieldable center portion 68 of the spout 14 at a point intermediate of two tubular members 124 and 126 that are mounted upon the shelf 104. The resultant deformation of the yieldable spout portion 68 effectively closes the powder discharge conduit formed by said spout. When the operator depresses the handle 114 of the actuating lever 110, however, the lug 108 projecting from the outer face of said lever 110 comes against a nut 128 provided on the free lower end of the link 106 and pulls said link downwards which is effective to swing the bar 100 in clockwise direction as viewed in Fig. 5 against the urgency of spring means 120 into the position shown in full lines in said Fig. 5. As said bar slides with its guided end within the slot 116 toward the upper end thereof, it comes against the nose 130 of a detent 132 that is pivoted to the plate 118 above said slot 116 (Fig. 6), and cams said detent out of its way against the force of a spring 134 which operates to urge the detent into a position wherein it overlaps the slot 116. Hence, when the upwardly moving bar 100 has passed the detent 132, said detent snaps into position behind the bar 100 and securely latches said bar in raised condition as shown in full lines in Fig. 5. In said raised condition, the pressure exerted by shoe 122 upon the yieldable portion of the spout is sufficiently released to permit flow of a fluidized powder through the spout 14.

Figures 3, 4, 5, 6:
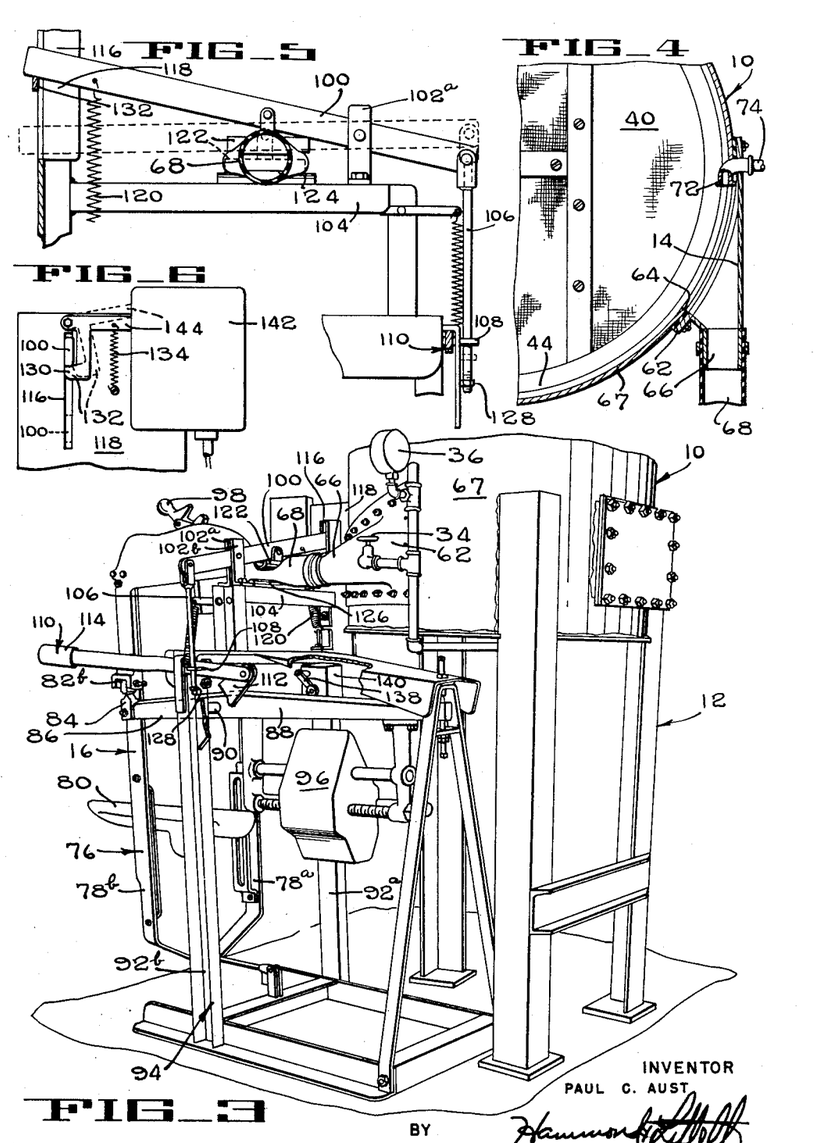
Fig. 3 is an enlarged perspective of the lower half of the apparatus viewed from a different point than Fig. 1.
Fig. 4 is a fragmentary plan view of a horizontal section through the fluidized chamber taken along line 4—4 of Fig. 2.
Fig. 5 is a detail view illustrating the mechanism for cutting off the flow of powdered material from the fluidizing chamber.
Fig. 6 is another detail view showing part of the mechanism illustrated in Fig. 5 as viewed from a direction at right angles to the direction from which said mechanism is viewed in Fig. 5.

As the bag on the platform 80 is filled with the powder fluidized in, and escaping from, the tank 10, it gets heavier and heavier until it reaches a weight equal to the pull of the counterweight 96 on the opposite arm of the scale bar 88, and said bar begins to swing in counterclockwise direction as viewed in Fig. 3. Located directly above the upper edge of said last mentioned arm when in its idle position is the actuating arm 138 of a normally open switch 140, which is supported from the pedestal 94. Said switch 140 is located in the power circuit of a solenoid 142 that is supported from the guide plate 118 adjacent its slot 116. The armature of said solenoid engages a tail 144 formed on the detent 132, and upon energization of the solenoid, it swings said detent in counterclockwise direction as viewed in Fig. 6 withdrawing its nose 130 from underneath the guided end of a locking bar 100. The bar, therefore, follows the urgency of spring 120 and returns instantaneously to the horizontal position shown in broken lines in Fig. 5 wherein the flow of fluidized powder through the spout 14 is interrupted. Thus, the bag on the platform 80 is filled with precisely its predetermined quantity of powder, and may be taken from the platform 80 upon release of the retaining clamp 98.

In place of the filling and cut off mechanism just described it will be obvious that the filling and cut off mechanism illustrated in my said copending application Serial No. 456,676 may be used.

For best performance, i.e., for rapid flow, I have found it advantageous to establish a fluidized mass of considerable depth in the tank 10. In carrying out the process of my invention, to fill burned magnesia of a fineness passing through a 20 mesh screen into paper bags, a cylindrical tank 30 inches in diameter and 91½ inches in height was employed and air was injected into said tank through five air injection nozzles 28 symmetrically arranged on the floor of the tank, and one lateral air injection nozzle 72 under five pounds of pressure per square inch, which introduced eight cubic feet of air per minute into the tank. A column of fluidized mass about 77 inches high was maintained in the tank. When directing the fluidized mass of magnesia within the tank 10 through the spout 14 into a paper bag on platform 80, it packed into a materially lesser volume within said bag than the volume formerly occupied by the same weight in the same bag when the bag was filled according to conventional filling methods. None of the bags filled with the apparatus of the invention exploded, there was at no time any interruption of the filling process due to clogging. The required weight was filled into the bags in a very short time, and formation of dust around the bags was surprisingly low.

Figures 7, 8:
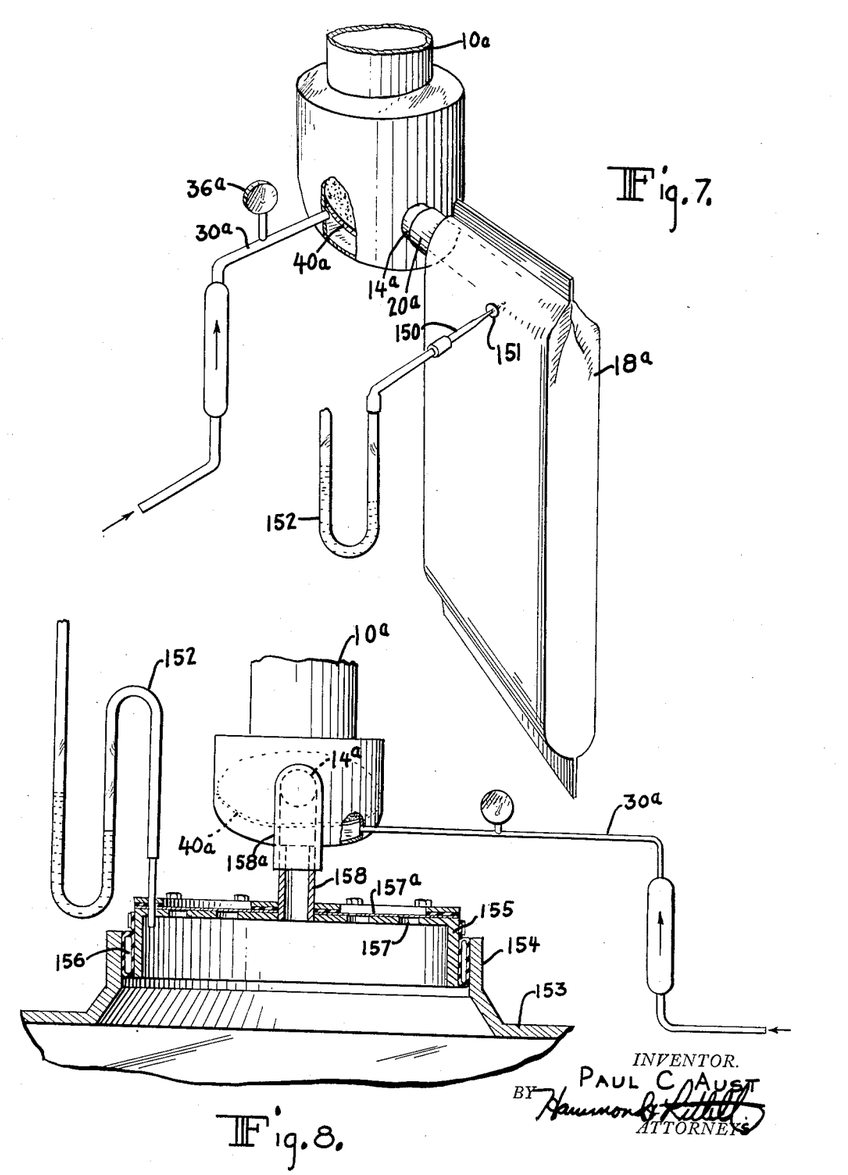
Fig. 7 is a view of one form of test apparatus used to demonstrate the operation of the machine and method illustrated in Figs. 1 to 6.
Fig. 8 is a view of another form of test apparatus used to demonstrate the operation of the invention.

To show the effect of column height and back pressure in the shipping container, on the density of powdered material packed in bags or other shipping containers, tests were conducted as illustrated in Figs. 7 and 8, and the results are set forth in the following tables and in the graphs of Figs. 9, 10, 11 and 12.

The test apparatus illustrated in Fig. 7 consisted of a fluidized column 10a similar to the fluidizing tank 10 illustrated in Fig. 1. The fluidized column 10a for test purposes was made 34 feet in height and 12¼ inches inside diameter, and was fitted with a canvas air distributing pad 40a below which the fluidizing air entered from the air supply manifold 30a fitted with a pressure gauge 36a and a control valve (not shown). Valve bags 18a similar to bag 18 to Fig. 1 having a filling snout 20a were fitted tightly over the filling nozzle 14a and filled in the manner described in connection with the method and apparatus of Figs. 1 to 6. For simplicity of illustration the flow control valve mechanism and other parts of the apparatus of Figs. 1 to 6 have been omitted from Figs. 7 and 8. To show the effect of back pressure developed in the bags during filling, the bags 18a were punctured near the filling spout with a hypodermic-like, sharpened, hollow tube 150 provided with a sealing ring 151 and the hollow tube was connected with a U-shaped mercury manometer 152 of conventional design. During filling of the bag the amount of back pressure created by the flow of fluidized powder and the accompanying fluidizing gas into the bags was shown by the manometer.

The test apparatus illustrated in Fig. 8 was essentially similar to that shown in Fig. 7, consisting of the fluidizing column 10a, distributing pad 40a, filling nozzle 14a, air supply 30a, etc. This apparatus was used for filling steel drums 153 provided with a flanged filling opening 154 and with a closure member therefor consisting of a perforated, inverted cup shape steel cover plate 155 having an inflatable doughnut shaped seal 156 around the circumference and connected with a source of compressed air by which the doughnut 156 could be expanded to make a tight seal with the flanged filling opening 154. The perforations 157 in the top of plate 155 extended in circumferential rows around the top of the plate 155 and were covered with a cotton muslin cloth diaphragm 157a to provide for a controlled release of air from the drum during filling. The filling tube 158 of the cover plate 155 was connected with the filling nozzle 14a by a piece of flexible tubing 158a tightly connected to the nozzle 14a and the filling tube 158. A mercury manometer 152 was connected to the cover plate 155 as illustrated to indicate the back pressure developed in the drums during filling.

For testing purposes, magnesia having particle size distribution as follows was used: +100 mesh 1.5%, +200 mesh 6.4%, +325 mesh 12.4%, −325 mesh 87.6%, average particle size 0.5 micron, bulk density 32.8 lbs. per cubic foot. This material was filled into multi wall paper bags 16″ x 4″ x 35″ having a volumetric capacity of 1.72 cu. ft. and into steel drums having a volumetric capacity of 4.03 cu. ft. in a series of tests described below. After the column 10a was filled substantially to the top with the powdered material and the material fluidized, the height of the fluidized column, before and after each bag or steel drum was filled to capacity and weighed, was measured and the average of these two heights was taken as the height of the filling column for filling that particular container.

Figure 9:
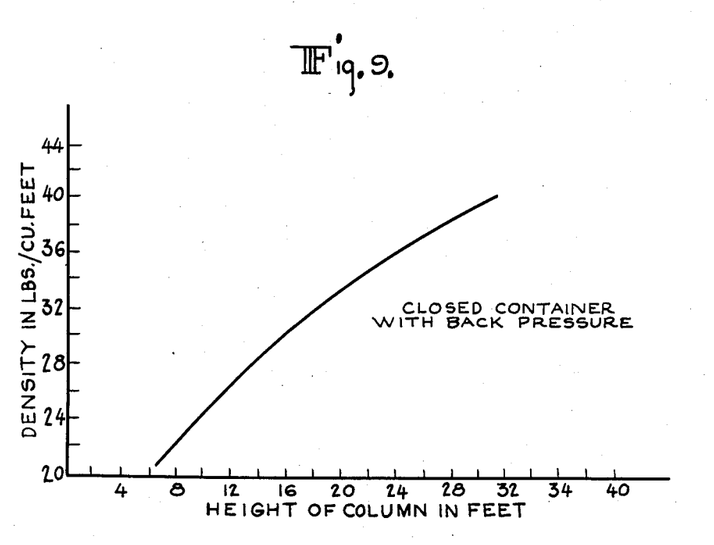
Fig. 9, Fig. 10, Fig. 11 and Fig. 12 are graphs showing performance data on the operation of the machine and method of this invention.

The effect of column height of fluidized material in increasing the density of powdered material packed into bags is illustrated in Fig. 9 which was plotted from two packing runs. The series of bags filled in emptying one column of fluidized material was considered as one run. The maximum back pressure reached during the filling of each bag was recorded and it varied in the different bags from 1.4 to 4.8 inches of mercury.

TABLE I

RUN NO. 1

| Average Height of Column, Ft. | Weight of Material In Each Bag, Lbs.—Oz. | Density, lb./cu. Ft. of Bagged Material |
|---|---|---|
| 30 | 71—5 | 41.4 |
| 27 | 64—4 | 37.3 |
| 24½ | 63—6 | 36.7 |
| 22½ | 64—4 | 37.3 |
| 20½ | 62—14 | 36.5 |
| 17 | 63—8 | 36.9 |
| 16 | 60—8 | 35.2 |
| 14 | 60—0 | 34.9 |
| 6 | 40—0 | 23.3 |

RUN NO. 2

| | | |
|---|---|---|
| 31½ | 69—4 | 40.2 |
| 28 | 65—2 | 37.9 |
| 25½ | 62—12 | 36.5 |
| 23½ | 58—8 | 34.1 |
| 21 | 56—8 | 32.8 |
| 19 | 59—0 | 34.3 |
| 16½ | 54—0 | 34.12 |
| 14½ | 58—8 | 34.1 |
| 14 | 48—6 | 28.1 |
| 11½ | 47—8 | 27.6 |
| 10 | 38—8 | 22.4 |
| 8 | 40—0 | 23.2 |
| 5½ | 36—0 | 20.9 |

The effect of the column height on the density of the material in paper bags with restricted escape of air therefrom whereby a back pressure is developed in the bag is illustrated in Fig. 9.

The maximum back pressure developed in the bags varied from 1.4 to 4.8 inches of mercury and the density of the material in the bags varied in direct relation to the back pressure as is shown by the following table:

TABLE II

| Back Pressure in Bags in Inches of Mercury | Density of Bagged Material, lbs./cu. ft. |
|---|---|
| 4.0 | 36.9 |
| 3.2 | 35.2 |
| 4.8 | 34.9 |
| 4.0 | 40.2 |
| 4.0 | 37.9 |
| 3.8 | 36.5 |
| 3.6 | 32.8 |
| 3.7 | 34.3 |
| 2.4 | 34.1 |
| 2.6 | 28.1 |
| 2.4 | 22.4 |
| 2.0 | 23.2 |
| 1.4 | 20.9 |

To illustrate the effect of back pressure in controlling the density of packing of fluidized powdered material, two series of packing tests were run in the apparatus of Fig. 8. In one series the fluidized material was allowed to flow from the bottom of the fluidizing column 10ᵃ into steel drums 153 in which the flanged opening 154 was left open to the atmosphere. This was called an open steel container. In the other series the flanged opening 154 was closed by the doughnut closure 156 and the perforations in the closure were covered with a heavy cotton muslin cloth to provide restricted escape of air from the container and maintain a back pressure of from 1.2 to 4 inches of mercury.

TABLE III

Open steel container (no back pressure)

RUN NO. 1

| Average Height of Column, Ft. | Weight of Packed Material, Lbs.—Oz. | Density Material in Can, lb./cu. ft. |
|---|---|---|
| 30½ | 98—8 | 24.5 |
| 26 | 96—0 | 23.9 |
| 22 | 92—8 | 23.0 |
| 18 | 100—8 | 25.0 |
| 13½ | 103—0 | 25.6 |
| 9½ | 101—0 | 25.1 |
| 6 | 103—0 | 26.6 |

RUN NO. 2

| | | |
|---|---|---|
| 32 | 108—8 | 26.8 |
| 28 | 99—8 | 25.8 |
| 23½ | 98—0 | 24.3 |
| 19½ | 101—8 | 25.7 |
| 15½ | 106—8 | 26.4 |
| 11 | 114—8 | 27.3 |
| 7 | 107—8 | 26.6 |

RUN NO. 3

| | | |
|---|---|---|
| 25 | | 26.2 |
| 20½ | | 23.7 |
| 16½ | | 25 |
| 12½ | | 25 |

Figure 10:
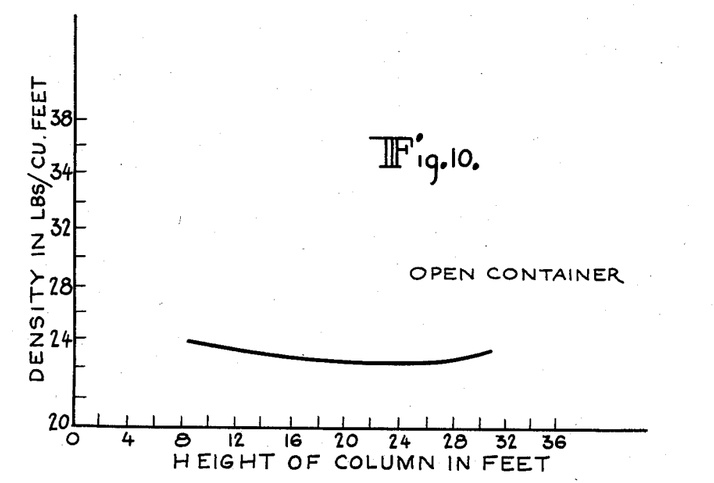

The graph of Fig. 10 shows that any effect of the height of the column in increasing the density of the fluidized material at the bottom of the column is lost if the material is merely filled into an open container without back pressure.

TABLE IV

Closed steel container (with back pressure)

RUN NO. 1

| Average Height of Column, Ft. | Weight of Material Packed, Lbs.—Oz. | Can Back Pressure, Inches Hg | Density Material in Can, lb./cu. ft. |
|---|---|---|---|
| 30½ | 123—8 | 2.2 | 30.7 |
| 25 | 110—4 | | 27.4 |
| 20 | 110—0 | 2.2 | 27.3 |
| 16 | 110—4 | 2.2 | 27.4 |
| 12 | 110—0 | 1.4 | 27.3 |
| 9 | 97—8 | 1.8 | 24.2 |

RUN NO. 2

| | | | |
|---|---|---|---|
| 30 | 124—8 | 2.3 | 30.9 |
| 24½ | 124—0 | 2.1 | 30.8 |
| 19½ | 114—8 | 2.4 | 28.4 |
| 15½ | 125—0 | 2.3 | 30.9 |
| 11½ | 111—8 | 2.1 | 27.6 |
| 7 | 114—0 | 1.5 | 28.3 |

RUN NO. 3

| | | | |
|---|---|---|---|
| 31 | 120—8 | 3.8 | 29.9 |
| 26½ | 109—8 | 4.0 | 27.2 |
| 21½ | 115—0 | 2.6 | 28.5 |
| 16½ | 114—8 | 2.6 | 28.3 |
| 12½ | 111—8 | 2.2 | 27.6 |
| 8 | 108—8 | 1.8 | 29.1 |
| 4½ | 99—8 | 1.2 | 26.8 |

RUN NO. 4

| | | | |
|---|---|---|---|
| 29½ | 124—8 | 4.0 | 30.8 |
| 24 | 114—8 | 3.8 | 28.3 |
| 19½ | 101—8 | 2.6 | 25.1 |
| 15½ | 98—8 | 2.4 | 24.5 |
| 8½ | 99—8 | 2.2 | 24.7 |

Figure 11:
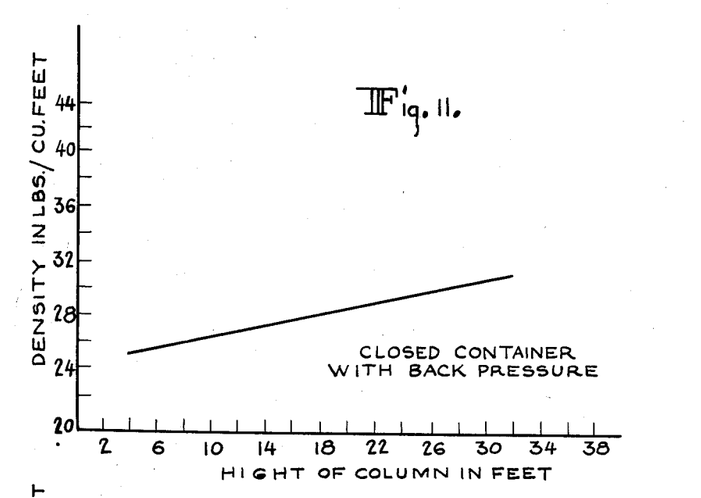

The graph of Fig. 11 shows that by maintenance of back pressure in the shipping container the densifying effect of increased column height on a fluidized column of powdered material can carry into the container and that fluidized powdered material can be packed to a greater density in a given size shipping container in this way. For example, Fig. 11 shows that an increase in density of from 25 lbs./cu. ft. to 31 lbs./cu. ft. can be gotten under the conditions described by increasing the average height of the fluidized column from 4 ft. to 32 ft. The densifying effect illustrated in Fig. 11 was far less than that obtained in filling into paper bags of the type of bag 18 with back pressure and comparative tests on open mouth paper bags without back pressure showed less densification than with ordinary packing methods.

Figure 12:
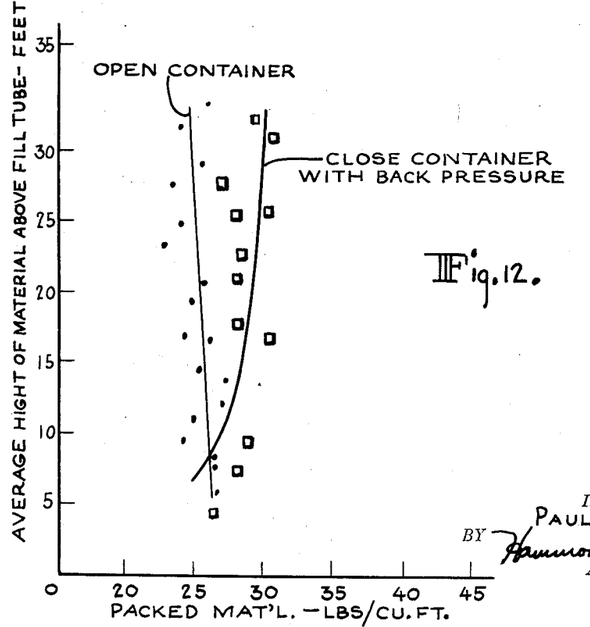

Fig. 12 is a composite graph showing the comparative change in density with increase in fluidized column height when the fluidized material is packed into an open container with no back pressure and when packed into a closed container with controlled back pressure.

In the embodiment of the invention illustrated in Figs. 1 to 7 for filling closed end paper bags the amount of back pressure developed in the bag may be controlled by the distance the filling opening 20 in the side of the bag is pushed onto the frustro conical filling spout and by the area of the bag which is tightly clamped between the clamp 98 and the filling nozzle 70, to thereby restrict the outflow of air or gas from the bags.

As the bags 18 are being filled with the fluidized powdered material, the material flows into the bags rapidly at the beginning of the filling operation and as the back pressure builds up in the confined space at the upper end of the bags or containers, the back pressure opposes the hydrostatic like head of fluidized material at the base of the fluidizing column and retards the flow of material into the bags or containers. As the pressure in the upper end of the container approaches the pressure on the column of powdered material flowing into the container the rate of flow of material into the container is automatically reduced, thus providing high speed rapid filling of the containers with automatic dribble or reduction of filling speed toward the end of the filling operation whereby further flow may be cut off by bar 100 and accurate weights with rapid filling may be obtained without the use of auxiliary dribble feeding mechanism and complicated feed cut off mechanisms normally used in the industry.

The method and apparatus herein described is applicable in the packing of most powdered materials which are free flowing under fluidization. Some powdered materials will densify more than others, however, when packed according to the methods herein described.

While I have described my invention with the aid of a particular embodiment thereof as illustrated in Figs. 1 to 6, it will be understood that I do not wish to be limited to the specific constructional details of the apparatus shown or the method described, which may be departed from without departing from the scope and spirit of my invention.

I claim:

1. The method of filling powdered material into shipping containers which comprises delivering the material into a confined space at the upper end of the shipping container, placing the powdered material into a fluidized condition by counter flow of a gaseous medium therethrough before filling into the shipping container, directing said powdered material in fluidized condition into the shipping container and maintaining a back pressure in the shipping container.

2. The method of filling powdered material into shipping containers which comprises delivering the material into a confined space at the upper end of the shipping container, placing the powdered material into a fluidized condition by counter flow of a gaseous medium therethrough before filling into the shipping container, directing said powdered material in fluidized condition into the shipping container and maintaining a back pressure in the shipping container by restricting the escape of said gaseous fluidizing medium therefrom.

3. The method of filling powdered material into shipping containers which comprises delivering the material into a confined space at the upper end of the shipping container, placing the powdered material into a fluidized condition by counter flow of a gaseous medium therethrough before fillng into the shipping container, directing said powdered material in fluidized condition into the shipping container and maintaining a back pressure in the shipping container of between 0.4 and 3.16 p.s.i.

4. The method of increasing the density of packing of a powdered material in a shipping container which comprises fluidizing the powdered material in a shipping container feeder by flowing a gaseous fluid upwardly therethrough, maintaining the fluidized material at the bottom of said feeder under a pressure head sufficient to increase its normal packing density and feeding said powdered material from adjacent the bottom of said feeder into a shipping container while simultaneously restricting the escape of the gaseous fluid from said shipping container to substantially maintain the increased density of said powdered material in the shipping container.

5. The method of increasing the density of packing of a powdered material in a closed end bag which comprises fluidizing the powdered material in a shipping container feeder by flowing a gaseous fluid upwardly therethrough, maintaining the fluidized material at the bottom of said feeder under a pressure head sufficient to increase its normal packing density and feeding said powdered material from adjacent the bottom of said feeder into a closed end bag while simultaneously restricting the escape of the gaseous fluid from said bag to substantially maintain the increased density of said powdered material in said bag.

6. The method of controlling the weight of powdered material packed into shipping containers from a column of powdered material fluidized by a gaseous fluidizing medium, which comprises flowing the fluidized powdered material from adjacent the bottom of said fluidized column into a shipping container with restricted escape of gases therefrom, controlling the escape of gaseous fluid from the shipping container, building up the back pressure in the shipping container as the material packed into the shipping container approaches the upper end of the shipping container to thereby retard the rate of flow of powdered material into the shipping container as the container reaches the desired weight and cutting off the flow of fluidized material when the desired weight is reached.

7. The method of controlling the weight of powdered material packed into shipping containers through a compressible tube from a column of powdered material fluidized by a gaseous fluidizing medium, which comprises flowing the fluidized powdered material from adjacent the bottom of said fluidized column through said compressible tube into a shipping container restricting the escape of gases from the shipping container, building up the back pressure in the shipping container as the material packed into the shipping container approaches the upper end of the shipping container to thereby retard the rate of flow of powdered material through said compressible tube into the shipping container as the container reaches the desired weight and automatically cutting off the flow of fluidized material when the desired weight is reached, by compressing said tube to stop further flow of said powdered material therethrough.

8. The method of controlling the weight of powdered material packed into a closed end paper bag through a compressible tube from a column of powdered material fluidized by a gaseous fluidizing medium, which comprises flowing the fluidized powdered material from adjacent the bottom of said fluidized column through said compressible tube into said bag restricting the escape of gases from said bag, building up the back pressure in the bag as the material packed into the bag approaches the upper end of the shipping container to thereby retard the rate of flow of powdered material through said compressible tube into the bag as the bag reaches the desired weight and automatically cutting off the flow of fluidized material when the desired weight is reached, by compressing said tube to stop further flow of said powdered material therethrough.

9. The method of controlling the weight of powdered material packed into a closed end paper bag from a column of powdered material fluidized by a gaseous fluidizing medium and flowed into said bag in fluidized condition under the pressure of said fluidized column, which comprises flowing said material rapidly into the bag at the beginning of the filling operation, building up a back pressure in the bag as the powdered material approaches the top of the bag, automatically retarding the rate of flow of said powdered material into the bag as the back pressure approaches the pressure at which the fluidized material flows into the bag and automatically cutting off the flow of fluidized material into the bag when the bag reaches a predetermined weight.

10. The method of controlling the weight of powdered material packed into a closed shipping container from a column of powdered material fluidized by a gaseous fluidizing medium and flowed into said container in fluidized condition under the pressure of said fluidized column, which comprises flowing said material rapidly into said container at the beginning of the filling operation, building up a back pressure in said container as the powdered material approaches the top of the container, automatically retarding the rate of flow of said powdered material into the container as the back pressure approaches the pressure at which the fluidized material flows into the container and automatically cutting off the flow of fluidized material into the container when the container reaches a predetermined weight.

11. The method of filling powdered material into a shipping container which comprises establishing and maintaining a fluidized substantially vertical column of said powdered material by passing a fluidizing gas upwardly through said powdered material in said substantially vertical column, feeding said fluidized powdered material into a confined space in the upper end of a shipping container and maintaining a back pressure in said shipping container of between 1.2 and 4.8 inches of mercury during the filling thereof.

12. The method of filling powdered material into a shipping container which comprises establishing and maintaining a fluidized substantially vertical column of said powdered material by passing a fluidizing gas upwardly through said powdered material in said substantially vertical column, maintaining the fluidized material at the bottom of said column under a pressure head sufficient to increase the normal packing density of said powdered material and feeding said powdered material from adjacent the bottom of said column into a shipping container while simultaneously restricting the escape of the fluidizing gas from said shipping container to create a back pressure therein and substantially maintain the increased density of said powdered material at the bottom of said column in said shipping container.

References Cited in the file of this patent
UNITED STATES PATENTS

| | | |
|---|---|---|
| 1,842,969 | Heyman | Jan. 26, 1932 |
| 2,009,408 | Middleboe | July 30, 1935 |
| 2,181,756 | Cook | Nov. 28, 1939 |
| 2,589,968 | Schemm | Mar. 18, 1952 |
| 2,795,389 | Aust | June 11, 1957 |